United States Patent [19]

Barry

[11] Patent Number: 4,483,652
[45] Date of Patent: Nov. 20, 1984

[54] TWO-ARM ROTARY LOADER AND METHOD OF OPERATION

[76] Inventor: Leonard D. Barry, 19300 Pennington Dr., Detroit, Mich. 48221

[21] Appl. No.: 338,069

[22] Filed: Jan. 8, 1982

[51] Int. Cl.³ .................... B65G 67/02; B60P 1/64
[52] U.S. Cl. ............................... 414/392; 104/29; 414/392; 414/744 R; 414/917
[58] Field of Search ............... 414/337, 390–392, 414/399, 786, 744 R, 917; 104/28, 29

[56] References Cited

U.S. PATENT DOCUMENTS

| | | | |
|---|---|---|---|
| 4,065,006 | 12/1977 | Barry | 414/337 |
| 4,124,129 | 11/1978 | Barry | 414/391 |

Primary Examiner—Robert G. Sheridan

[57] ABSTRACT

This is a rotary loader for transfer of cargo containers, flat beds or pallets, racks, or other loads to and from railroad cars or vehicles moving by and is rotated to turn either end to a dock or building for convenient end loading. Standard or wide end-door cargo containers can be transferred and supported on the loader and the loader turned so the door end of the container is at or over a dock so fork trucks or other vehicles can be driven over a dock board straight in and out from the cargo container. One form of the loader has two vertical posts equally spaced from a railway track or driveway and a horizontal rotary arm connected on each post to rotate parallelly through an arc with cam lift for transfer as my earlier loader, but the arms are free to be rotated differently from dead center position to rotate either end of the load to the dock or building doorway. The loader can be rotated to and from the dock by hand or by cable and winch or by a separate reversible drive or motor for each arm. The preferred loader features shiftable support wheels for alternately running two concentric cam track rings about each pivot post, the rings about each post being connected by a transfer-slope-crossing into one continuous cam track for transfer to or from a train in either direction. The loader and vehicle have auxiliary side couplings and controls to start the loader to side couple the moving vehicle for transfer. Another form of the loader has two arms for transfer of the load, but only one of these substantially supports the load.

15 Claims, 34 Drawing Figures

TWO-ARM ROTARY LOADER AND METHOD OF OPERATION

CROSS REFERENCE TO RELATED PATENT AND APPLICATIONS

This invention relates to my U.S. Pat. No. 4,124,129 filed Nov. 7, 1978, and Nos. 4,370,085 and 4,370,086 both filed Aug. 15, 1979 and No. 4,362,456 filed Nov. 6, 1978.

An inherent characteristic of my prior two arm rotary loaders is that from a position where both load arms are in line at dead centers one arm can be moved in either direction without moving the opposite arm the same. This I long recognized—but not as useful for the purpose now proposed. Instead I provided means to coordinate the arms parallel past dead centers or to otherwise avoid dead-center positions. It is now proposed to utilize this turning of the loader from the parallelogram form to turn the load, a container, pallet, or rack, either end to a dock so it can be unloaded and loaded from the end rather than the side and so the cargo containers not having side doors can be unloaded without needing to be set on a flat bed trailer and driven to the dock, and so a fork truck can be driven straight in and out from the container through the end doorway, especially since the usual eight foot wide container has no side doors and is too narrow to drive a fork truck in and out through a side doorway and turn to load or unload either end of the container.

Overseas type containers are moved from ship terminal by highway or rail. If by rail they are moved terminal to terminal and put on highway chassis for movement from terminal to customer. The customer may be on rail and passed enroute because there is no fast and convenient way to deliver the containers from the train and because the containers have only end doors they cannot practically be unloaded or loaded if left on a flat car or on the loader parallel the dock or building. Existing devices such as overhead cranes, fork lifts, straddle carriers etc. are too expensive for occasional use and would take cooperation between the dock and train crews and delay the train and its crew while the container is removed from or put on the train.

Therefore an object is to provide a low cost rotary loader which can transfer a container, pallet, or rack from a car in a moving train and turn either end of the load to a dock so that the end having doors or the end desired for loading can be turned to the dock so a fork truck or other vehicles can be driven straight in and out from the container, pallet, or rack for convenient end loading and unloading. A further object is to provide a loader which can take various sizes of containers, pallets, and racks and turn them either end to a dock.

An object is to place the loader on the opposite side of the siding from the dock where it does not interfere with utilization of the dock for freight car loads.

Another object is to keep the way freight or branch line track served by the loader clear of the loader and its load while turned either end to the dock.

A further object is to provide improved low-cost means for the rotary loader to safely transfer to or from a train in either direction.

A further object is to reduce the cost of the loader by providing a low cost starting actuator or coupling means so the loader need not be self powered. It is also an object to provide an optional selection of drives for turning the arms of the loader to rotate the loader either end to the dock or building and later to return the loader to parallelogram form for transfer of a load on a vehicle.

An object is to provide this new method for operating the rotary loader to increase its utility.

A further object is to increase the capacity of a given length of dock with this loader by turning the load end to the dock leaving room for a freight car or other vehicle to be moved alongside or to the dock in the space saved from turning the container end to rather than parallel the dock.

Some related objects include: to provide low-level open-sill cars for supporting the container, pallet, or rack etc. so the floor of the container etc. is at box car floor height along the dock and a loader which transfers the container etc. from the car to a dock along the siding and swings either end of the container just above the dock for convenient loading and unloading; to provide means for securing various sizes of containers on the car; to provide wide box car sized containers with both end and side doors for the low level car and which can be transferred by the loader and turned end to the dock or left on the car at a dock, wherever no loader is available, with the floor of the container at about box car floor height, so the dock for box cars will serve well for the container; and to provide wide containers, beds, or racks for the low level car so highway vehicles can be driven onto the end of the container, bed, or rack from the dock.

These, other, and further objects, features, and applications are attainable with this invention and should be obvious from study of this specification by those skilled in the related arts and with reference to the drawings wherein.

Referring to the drawings and in particular to FIGS. 1-6, rotary loader 18 along railway siding ST is reaching under container 20 on a car 22 in train 24 passing the loader left to right to unload the container from the car and turn end A or B, whichever has doors 25, to dock D on the opposite side of track ST from the loader after the train is clear of the dock area required.

Figure 1:
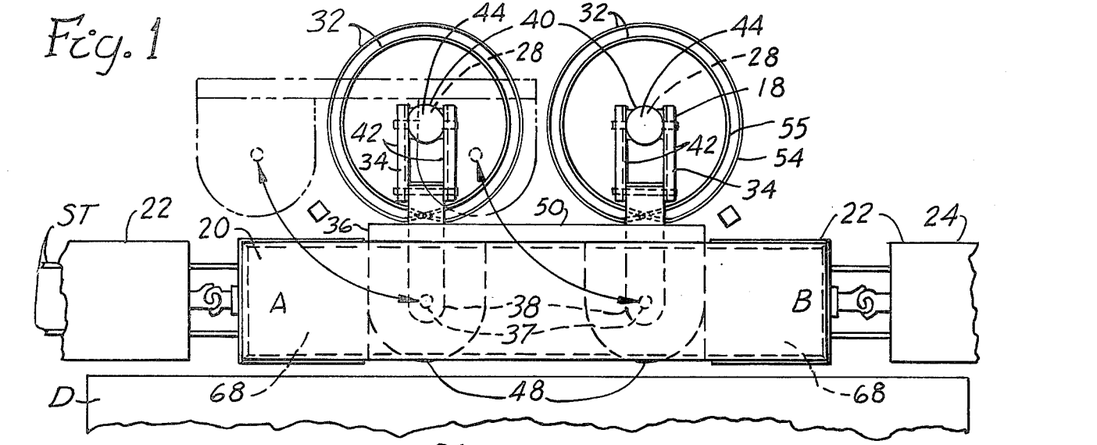
FIG. 1 is a plan view of a rotary loader on the opposite side of a siding from a dock and fully engaged under a container on a railway car in a train, the loader also being shown in phantom in starting or finishing position of the transfer according to the train's direction of movement.
Figures 2, 3, 4, 5, 6:
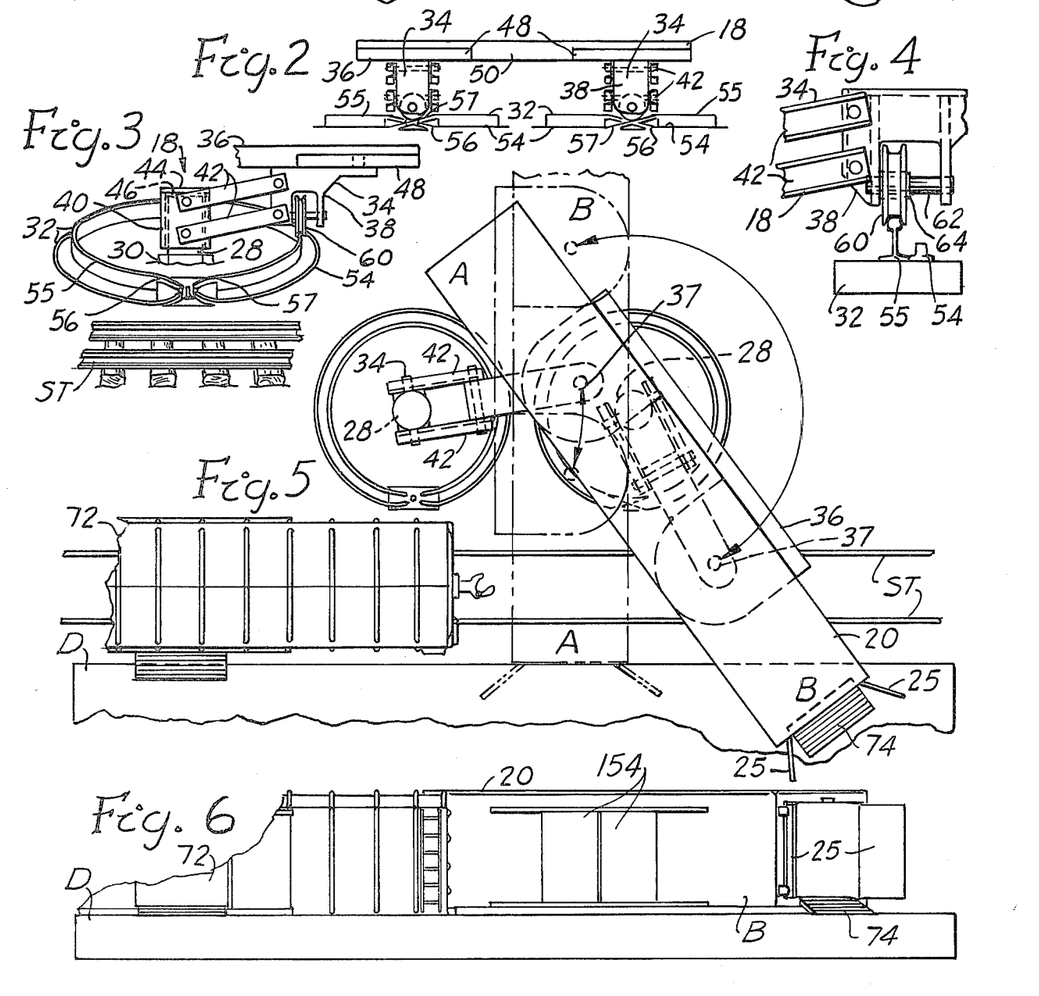
FIG. 2 is a front elevation of the loader of FIG. 1 in the same midtransfer position.
FIG. 3 is a front view of the right half of the loader to a larger scale after turning 90° to present a side view of an arm of the loader on its cam track shown tilted along with the railway track for clearness.
FIG. 4 is a partial side elevation of the loader arm of FIG. 3 on a section of the cam track to larger scale to show how the wheel supporting the arm thereon is shifted by the cam track.
FIG. 5 is a plan view of the loader of FIG. 1 after lifting the container from the car and turning the container end over the dock with a box car along the dock, the loader with container also being shown in phantom turned with the reverse end to the dock.
FIG. 6 is an elevation projected from FIG. 5.

The loader has two vertical pivot posts, pipes 28, equally spaced from track ST and embedded in a concrete base 30 and filled level to the top with concrete, a concentric cam track 32 around each post, a load transfer arm 34 mounted to revolve around each post and a loadspreader 36 pivotally supported on both arms 34 with pivot pins 37 at equal distance from the axis of the arm's pivot post. The load arm 34 includes a load bracket 38 and a sleeve 40 pivotally connected by parallel arm members 42 into a parallelogram linkage. The sleeve has a flat top plate 44 and is slip fit over pipe 28 and supported on an antifriction plastic disc 46 of UHMW polymer on top of the post. A liner 47 of the same material is preferably provided between the sleeve and the post. Loadspreader 36 is a forked or double platform of two rounded end turntables 48 for each fully extending under the container 20 and each mounted on a bracket 38 and connected together by a yoke 50 along the side of the container which faces the pivot posts when the arms are extended to the car for transfer. The yoke can be a link between the pivot centers of and under the turntables but is preferred as shown. Turntables 48 are on one plane and topped by an antiskid material such as soft rubber to hold the container in place thereon. The cam track 32 has two concentric loops 54 and 55 about each pivot post, 54 being low for supporting the loader to engage under a container on the car and 55 being high to support the container above the car, yet with the loader engaged with the car. The loops are connected by opposite slopes 56 down to the right and 57 up to the right crossing each other at point 58 where closest to tangency with track ST (FIG. 3) to form one cam track 32 for continuous support of the arm 34 about each pivot post. Each bracket 38 has a large double-flanged wheel 60 mounted on an axle 62 radial to the pivot 28 for the arm and has a sleeve bearing 64 to slide on axle 62 to follow the cam track in the groove of the wheel 60 to support, lift, and lower the arms together equally on alternate rotations of the arms about the pivots to lift off or set down the container in either direction of rotation of the loader for loading or unloading a car moving in either direction.

The container is supported on end pedestals or platforms 68 on car 22 so there is space for the loader to key or locate between the platforms under the container. The loader is operated by engaging it with the car by any of various possible means some of which will be described later herein. The turning of one arm 34 turns the other 34 equally while the arms are connected by yoke 50 in a parallelogram up to the point where both arms are parallel at dead centers.

When the loader is in parallelogram configuration on the low round 54 of the cam tracks 32 and is engaged partway under container 20 on car 22 moving to the right, the car moves the loader fully under to position of FIG. 1, where slope 57 lifts the loader to engage and lift the container as the train moves the loader counterclockwise with container 20 parallelly out from the car 22 to clear the side of the train. When the train has gone and track ST is clear, the loader with container can be swung back parallel the dock, but preferably the loader is rotated to turn either end of the container to the dock.

To do this the loader is first turned counterclockwise to dead-center position, where the arms are extended in line. Dead-center positions are 90° either direction from the position of FIG. 1 where the loader is at the point of tangency of the arc swept by arms 34 around the pivots with the line of travel of the train. From these dead-center positions arms 34 need not remain parallel. The arm 34 at the right is turned clockwise to swing the B end of the container, having doors 25, to the position shown solid in FIG. 5. If the doors are at the A end, the same arm is turned counterclockwise to position the A end at the dock as also shown in phantom. When the container is positioned as desired at the dock a railway car 72 can be moved by car puller or other means up along side of the dock, which is at a proper height for the box car and for a container 20 if left on a car 22 at the dock. The container turned on the loader either end to the dock is slightly higher than the dock so it clears above the dock as shown at B and in FIG. 6. A short ramp board 74 between the dock and open end of the container will make it easy for a fork truck to be driven in and out of the container for convenient loading or unloading.

Figure 7:
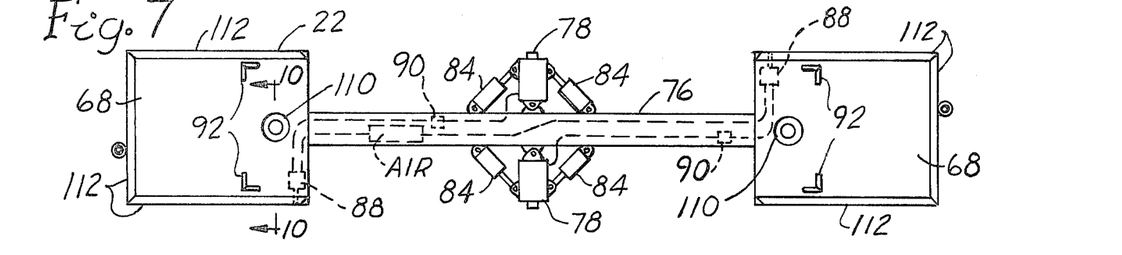
FIG. 7 is a plan view of the preferred railroad car.
Figure 8:
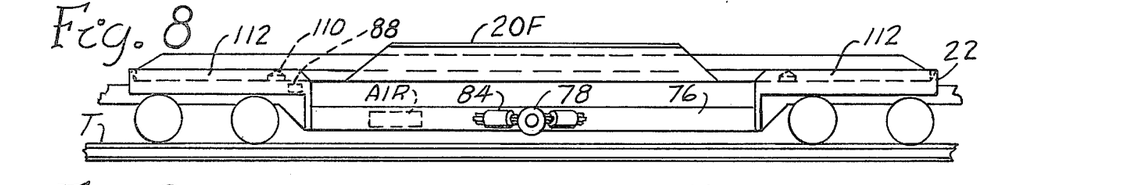
FIG. 8 is a side view of the car with a pallet.
Figure 9:
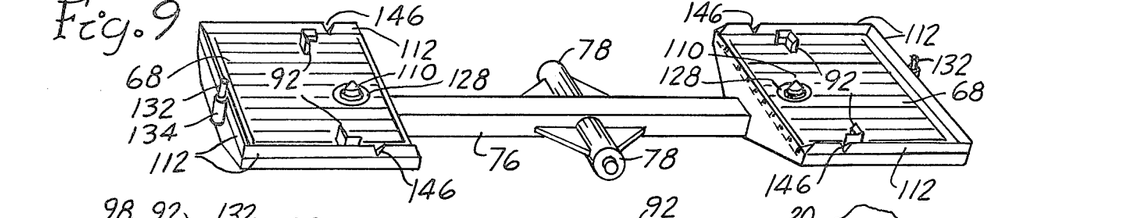
FIG. 9 is a perspective view of the vehicle bed for cooperation with the loader.

Referring to FIGS. 7-9, car 22 or other vehicle has a depressed center sill 76, end pedestals or platforms 68 secured to the sill and an air ram coupling cylinder 78 central on each side of the sill for engaging a starting arm on the loader. This bed is supported on standard railroad trucks and fitted with couplers etc. as required or can be a semitrailer bed, FIG. 9.

The side coupling piston or ram cylinders are preferably pivotally mounted at their base to the sill to swing horizontally and are normally held at about 90° to the sill by one or more shock absorbers, cylinders 84, pivotally connected between the sill and the outer end of cylinder 78. Cylinders 84 have a heavy coil compression spring in the rod end to take some of the coupling shock and yield to prevent side coupling of the loader if the force is too great. Coupling cylinders 78 are retracted by a coil spring therein and extended by air a few inches to the end of travel for engaging a loader set for coupling the car. Each cylinder 78 is connected through a spring closed valve 88 on the opposite side of the car from the coupling cylinder controlled thereby where an operator can open it momentarily to extend the cylinder's coupling rod. Cylinder 78 is connected through valve 88 to air supply reservoir AIR. A bleed valve 90 connected to each cylinder 78 exhausts the cylinder gradually so as not to leave the rod extended for a longer time than needed to start the loader to couple the car at a low speed.

Figure 10:
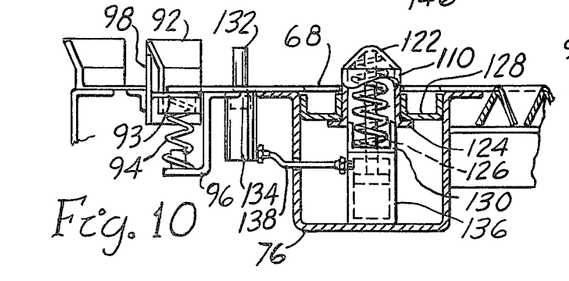
FIG. 10 is a section on line 10—10 of FIG. 7 to larger scale.
Figures 11, 12:
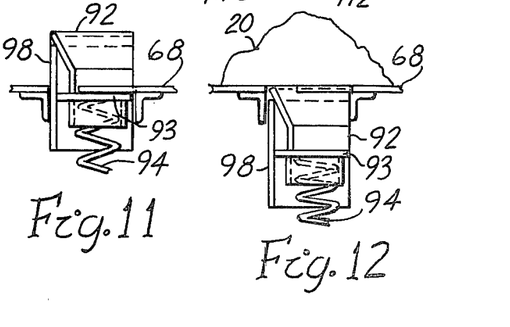
FIGS. 11 and 12 are a portion of FIG. 10 to larger scale showing the ciorner loactor in respectively raised and lowered positions.

The bed of the car or trailer has four recessing corner locators 92 for engaging the ends and sides of present standard 40 foot containers to hold them in place on the vehicle. Referring to FIGS. 10-12, each locator 92 is a corner angle with gusset 93 parallel below the deck and supported on a coil spring 94 supported on bracket 96 to the platform 68. The corner locating piece 92 is flaired out at the top with straight outer sides 98 guided in an opening in the platform to recess against spring 94, which pushes the gusset against the floor of the platform as a stop. These locators engage the four corners of the standard 40 foot container as is present practice, but when a longer or wider container is set on the vehicle the locators recess flush with the platforms as in FIG. 12.

Figure 13:
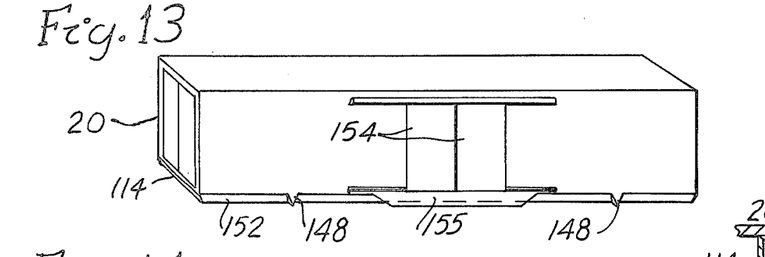
FIG. 13 is an oblique view of a box car sized container.
Figure 14:
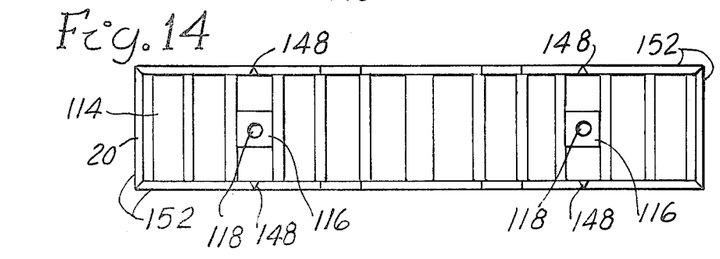
FIG. 14 is a bottom view of the container, pallet, or rack for the car and loader.
Figure 15:
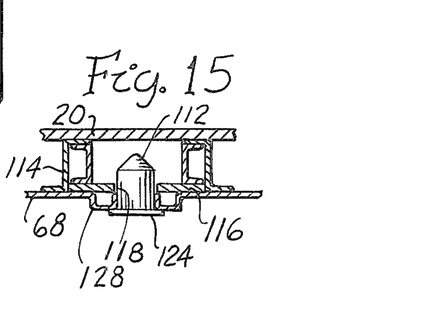
FIG. 15 is a section lengthwise through the floor of the container, pallet, or rack at a locator pocket.

Container 20 is secured in place on car 22 or the vehicle bed by either recessable locators 110 and/or low tapered curbs 112 on the sides and/or ends of the vehicle. The bottom 114 of container 20 or rack or pallet 20F (see FIGS. 13 and 14) have a location plate 116 at each end with a locating hole 118 spaced to be engaged by locators 110 on the vehicle for securing container 20. Each locator 110, FIG. 10, is a vertical cylinder with conical cap 122 and lower outer flange 124. A coil spring 126 lifts the locator up through the center of a ring-shaped drain pad 128 in the platform of the vehicle and is guided on tube 130 secured vertical in sill 76.

Locators 110 can operate tabs or rods 132 at ends of the vehicle as visual evidence that locators 110 are engaged in a container setting over them. Each rod 132 is that of a cylinder 134 actuated by hydraulic fluid from a piston cylinder 136 which has its piston rod extending up through and secured to the top of the locator 110. Each cylinder 136 is connected from the rod-side piston chamber by hydraulic tubing 138 to the cylinder 134 for raising the rod 132 at that end of the vehicle as a fail-safe indication the locator is raised engaging in a container setting thereon.

Car 22 can have shallow outward tapered ends and sides or curbs 112 in addition to or instead of locators 110 to hold containers 20 in place. Side curbs 112 have V-shaped locating openings 146, FIG. 9, which align with V-tapered blocks 148 flush with the sides on bottom tapered edges of the container, FIGS. 13 and 14, to secure the container lengthwise the car especially a container which is shorter than the car. The bottom of the wide containers 20 or pallets and racks, FIGS. 13 and 14, have tapered or chamfered edges 152 along the ends of the sides and at the ends to increase the alignment tolerance when being set on car 22. This taper 152 is the same angle as the low sides 112 and ends on car 22 to hold the load securely. This can be sufficient so locators 110 and bottom plates 116 can be omitted.

With this locating system car 22 can take a standard 40 foot overseas container using locators 92 or a longer 8 foot wide container using locators 110 or a container of car width (such as 10 foot wide)×40-60 feet long using the side locator curbs 112, or a longer car could take longer containers. Container 20, as shown is boxcar size and so could have side doors 154 on each side and be carried on the loader parallel the dock for side loading or unloading but not so close that the loader would run down slopes 56 or 57. Container 20, FIG. 13, can have drop-center sides 155 to strengthen the container under doors 154. The loadspreader with circular ended forks, turntables 48 and cars 22 are designed to clear the drop sides even a few inches below the bottom under the central portion of the container or pallet. The box car sized container 20 with side doors 154 can be left on car 22 on a siding which does not have a loader to transfer it, but since it is a quick-turn-around car the railroad can start charging demurage from the time it is left, which will encourage the customer to install a rotary loader so the car can remain in the train and carry many more loads than if left in a siding.

Figures 16, 17, 18:
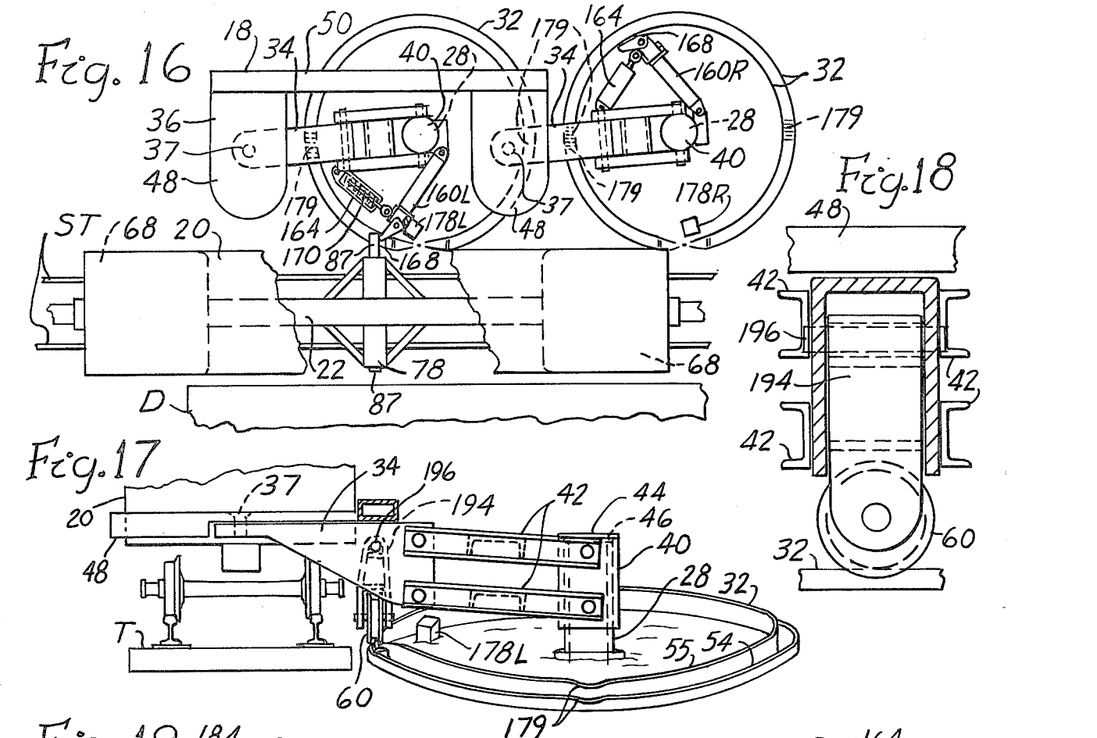
FIG. 16 is a plan view of the two arm rotary loader of the type in FIGS. 1-11 with starting arms added and being engaged by the car with a starting rod extended.
FIG. 17 is a side view of a load arm on the loader of FIG. 16 on its cam track and engaged under the container on the railway car to larger scale.
FIG. 18 is a section on line 18—18 of FIG. 17 to larger scale.
Figure 19:
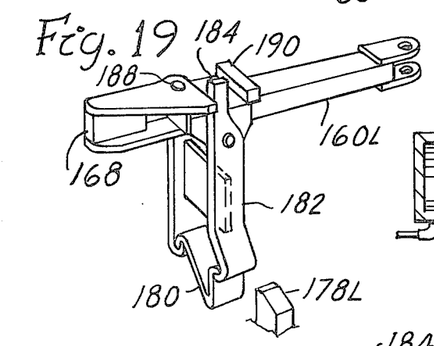
FIG. 19 is a perspective view of the starter arm of FIG. 16 and its stop pendant with stop latch in back of a stop.
Figure 20:
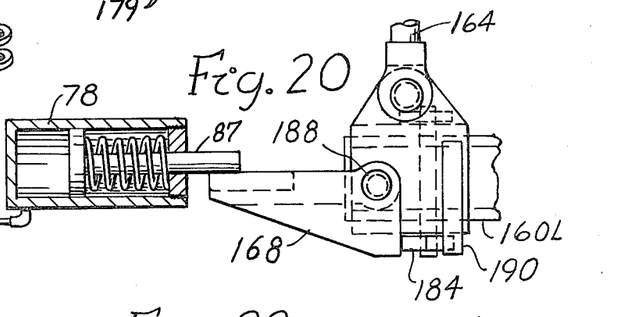
FIGS. 20, 21, and 22 are views of the stop and release pendant on the starting arm of FIG. 19 engaging a starting rod on the car as seen respectively from the front, top, and side of the starting arm.
Figures 21, 22:
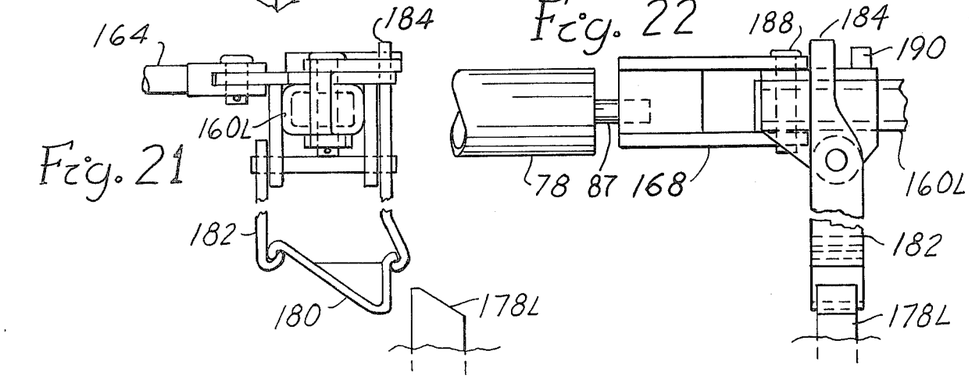

Referring to FIGS. 16-22, each arm 34 of loader 18 supports a starting arm 160L or 160R for engaging the rod of a cylinder 78. Arms 160L and 160R are the mirror image of each other and are each clevis connected to an extension from each sleeve 40 to swing horizontally and are held extended forward at about 45° from the opposite sides of arms 34 by a clevis mounted spring cushioned piston cylinder 164 connected between the bracket 38 and the outer end of arm 160L or 160R. Arms 160L and 160R each have a starting tongue lever 168 which must be extended before a car 22 with extended side coupler 78 can engage the loader. A compression coil spring 170 within cylinder 164 is compressed by the piston of the cylinder to cushion starting of the loader. As seen in FIG. 16, the arm 160L between the turntables 48 extends toward the approaching car 20 when the loader is in clockwise starting position at the left, while the other arm 160R is on the opposite side of the other arm 34 extending away from the car. After transfer the starting arms 160L and 160R will have rotated about 180° so each will face in the opposite direction to be in position to start the loader in the opposite direction to load the car. The loader could be revolved 360° to starting angle on the high cam track 55 to load the container on a train moving in the same direction it was unloaded from.

The loader rests against a latch stop 178L embedded in the ground to hold it in position to wait for engagement with the train or vehicle from the left. A similar stop 178R holds the loader in position for a vehicle from the right. The cam track has a shallow dip 179 at each stop so gravity will hold the loader against the stop. Starting arms 160L and 160R each have a stop latch 180 mounted on the bottom of a depending swing link 182, FIGS. 19-22, pivotally secured to the arm to swing in the vertical plane of the arm. The latch is lifted by the tapered top face of the stop 178L or 178R and drops behind the stop to hold the loader at the stop. Each link 182 has an upstanding extension tab or arm 184 engaged by starting lever 168 pivotally mounted on a vertical pin 188 on the end of the starting arm. When the rod 87 of an extended starting cylinder 78 on a car moving by engages lever 168 in the direction left to right in FIG. 16, lever 168 engages finger 184, moving it back in, to swing link 182 radially out from behind the stop 178L and against a stop block 190. Further force and movement on lever 168 starts the loader turning counter-clockwise through cushioning in springs of cylinders 164 and 84. Rod 87 disengages lever 168 after the loader has turned far enough to couple the vehicle 22 which continues to move the loader through transfer and until the loader swings clear of the car. When a rod 87 disengages a lever 186, gravity swings link 182 back like a pendulum which turns lever 168 back at about right angles to the starting arm so it will not engage a car until reset parallel to the arm after the loader is returned to that starting position. Starting arms are generally applicable to rotary loaders.

Referring to FIGS. 17 and 18, instead of having wheel 60 slide on its axle, especially for heavy loads, the cam track wheel can be mounted in a swing bracket 194 pivotally mounted on pin 196 parallel to the cam track to swing in a plane radial from the pivot 28 for the wheel to follow the cam track similarly as in my patent No. 4,362,456, FIG. 49.

DRIVES FOR THE LOADER

There are various ways to rotate the loader's arms 34 parallel for transfer and separately to turn them to turn the load either end to a dock.

Figure 23:
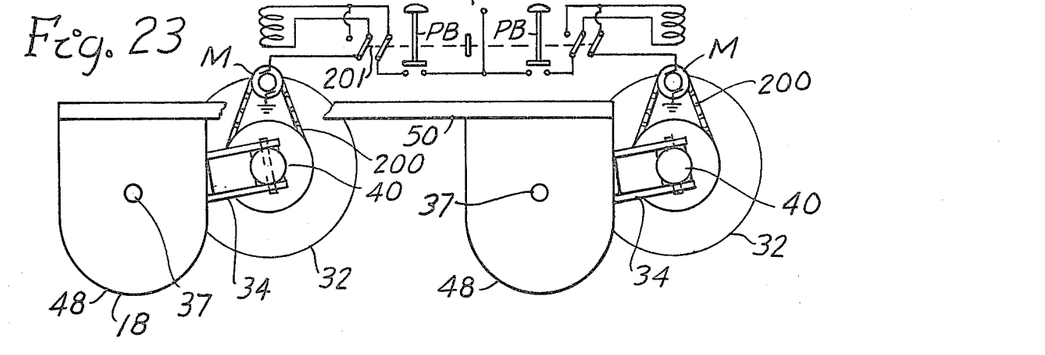
FIGS. 23, 24, and 25 are schematic views of various drives for the loaders.

Referring to FIG. 23, loader 18 has a separate motor M connected by chain and sprocket drive 200 to rotate each arm 34. Motors M are DC series type preferably and controlled by one or interlocked reverse switches 201 to operate in the same direction, but each motor has pushbutton controls PB to operate independently of the other motor M. Usually only one motor need be operated at a time for both parallelogram movement and separate unequal turning of the arms. Thus either motor can turn the loader in parallelogram form to dead-centers position where, if the motor is driving the arm pointing to the other arm, the arms will continue to rotate the loader through dead-centers position to continue the parallelogram form; or, if only the other motor is driving the arm pointing out from the loader; the loader continues to rotate while the other arm stops at dead-centers unless it has too much momentum that carries it through dead centers to continue parallel to the outreaching arm. The motor driving the outreaching arm can be reversed at dead-center position to turn the loader in the opposite direction especially if the in-pointing arm has moved slightly to the opposite side of dead centers from the direction it is desired to rotate the other arm. Thus by manipulating the motor controls the loader can be turned either end to a dock. Both motors M can be operated in the same direction to accelerate the loader more quickly to couple a car in a moving train than by using one motor or neither motor.

Figure 24:
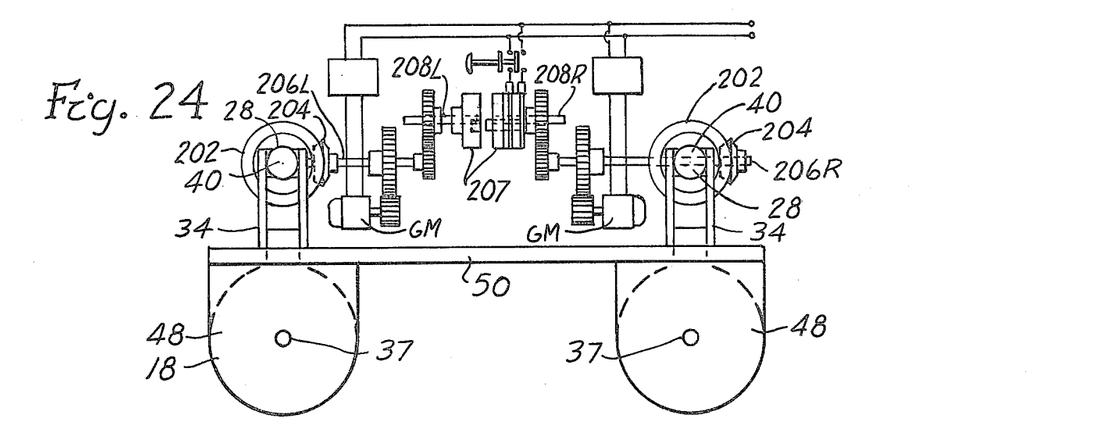

Though more complex and costly, the drive shown in FIG. 24 can carry arms 34 through dead centers with greater certainty and provide a more equalized drive torque on the arms. This drive coordinates the two arms 34 parallel for transfer and separately turns them for rotation of the load on the arms. Sleeves 40 each have a beveled gear 202 concentric on the bottom engaged with a beveled gear 204 on shaft 206L or 206R in line. Shafts 206L and 206R are connected together only when the arms 34 are parallel. This is done by pin-type clutch 207 which connects shafts 208L and 208R only in one position in 360° of rotation. Shafts 206L and 206R are connected through equal gearing respectively to shaft 208L and 208R in the ratio so shafts 208L and 208R are rotated once per revolution of arms 34 so the clutch can be engaged only when arms 34 are parallel. Each shaft 206L and 206R is driven by a separate gear-motor GM with clutch. Motors GM are operator controlled similar to motors M and are preferably declutched during transfer to reduce the drag or momentum of the gearmotors when not being used.

Figure 25:
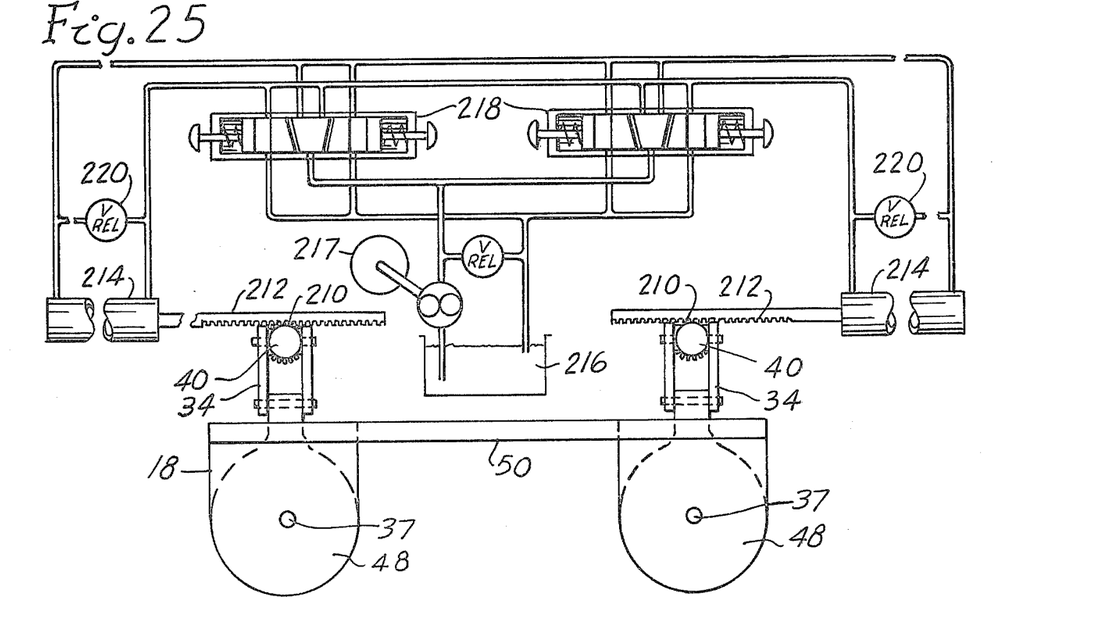

The loader might optionally be driven hydraulically as in FIG. 25, where each pivot sleeve 40 has a concentric ring gear 210 around the bottom of it and a gear rack 212 on the rod of a hydraulic cylinder 214 engaged with the gear 210 to turn each arm 34. Fluid is drawn from tank 216 by pump and motor 217 to either side of the piston of either cylinder 214 as controlled by hand valves 218 connected in a usual manner. This operates similarly as the drive of FIG. 23 except the gear racks are limited to a few turns of the arms and must not run out during transfer. The train may push the pistons of cylinders 214 which relieve through check valves 220. Therefore this arrangement may be least desirable of the three.

A car puller can be hooked to the loader in holes in the load spreader to rotate as desired similar as would motors M or GM.

VARIATIONS OF THE LOADER

Corresponding parts of variations are given the same numbers if the same or a suffix is added if the part is modified enough to mention.

The loader 18B of FIGS. 26–30 is basically similar to loader 18 except it has arms 34BL and 34BR with longer parallel arm members 42B so it can transfer a container 20 from car 22 in train 24 passing the loader along a branch or way-freight railroad track T and turn it either end to dock D along siding ST without blocking track T. The longer arms 34BL and 34BR necessitate farther spacing between pivots 28, here shown as pivot posts 28L and 28R, and between load support pivots 37 which result in pivots 37 being closer to the sides of load spreader 36B, which has two arms 48B rounded on the outfacing side to the front and rear and connected by yoke 50B and/or 50'B at respectively the back and front of the loader to engage a car 22 on track T. Yokes 50B and 50'B are shallow and flush with the bottom of the turntables 48B so the load spreader can reach under the side reinforcing 155 under doors 154 on containers. Arms 34B each have a steel wheel or roller 60BL or 60BR to support the arm on a cam track 32L and 32R respectively concentric about pivot posts 28L and 28R. Cam tracks 32L and 32R intersect at 224 necessitating three levels of the tracks, FIG. 27, low level 226, middle level 227, and high level 228, each connected by a cam slope 57; which requires a longer bracket (leg) 38L on the left arm 34BL than bracket 38R on the right arm 34BR to support the loader level on the different levels of tracks, similar as in my U.S. Pat. No. 4,370,085, FIGS. 17 and 18. But the high level track 228 must now cross the middle level track so the load can be turned either end to dock D. This is done by drawbridge 230, which has a bed bent at right angles, FIGS. 28-30, to form a short lift end 232 and a longer bridging end 234. Trunnions 236 at the sides on the axis of the bend support bridge 230 on brackets 238. The ends of the bed align track 228. The bridge is normally lifted as in FIGS. 28 and 29 so wheel 60BR can run onto the lower lift end and push the bridge end down raising the lift end. The bridge stays down until the wheel is returned and pushes the lift end down raising the bridge end so the other wheel 60BL of the loader can run past the bridge on the middle level when the arm 34BL at the left is turned to move the A end of the container or load to dock D.

Figure 26:
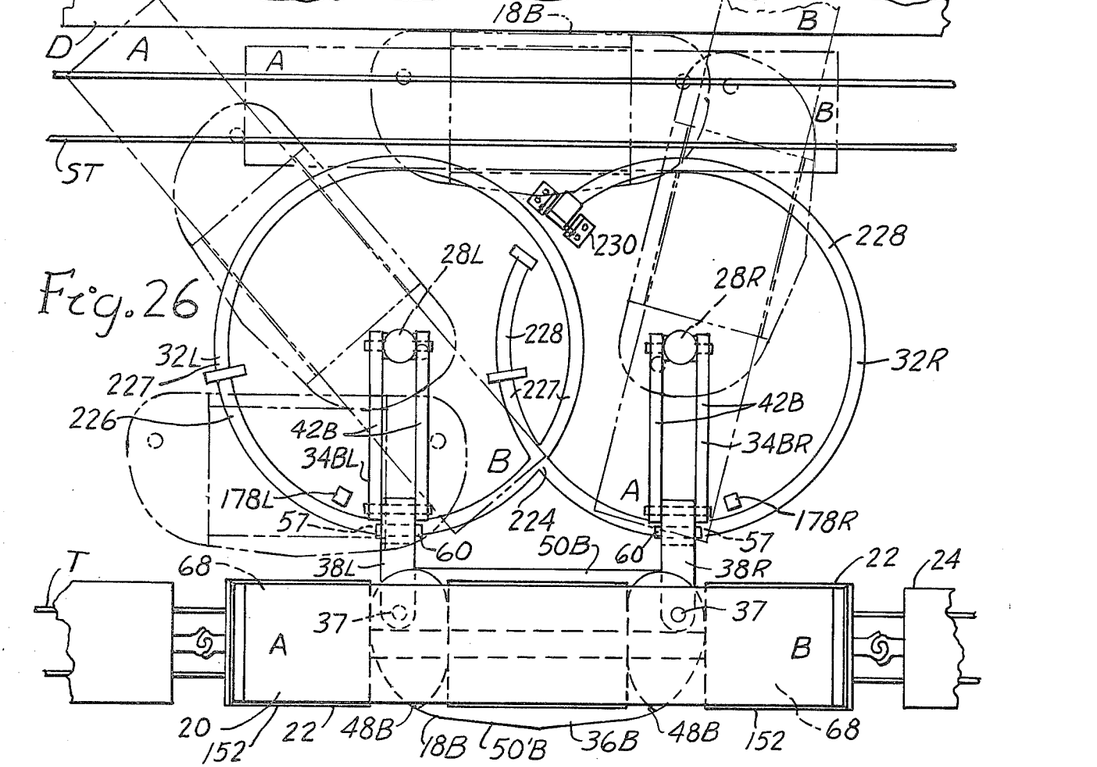
FIG. 26 is a plan view of a variation of the loader having longer arms engaging a container to transfer it from the car in the train moving to the right on a wayfreight line and to turn the container as shown in phantom parallel or either end to a dock while holding it clear from the railroad line.
Figure 27:
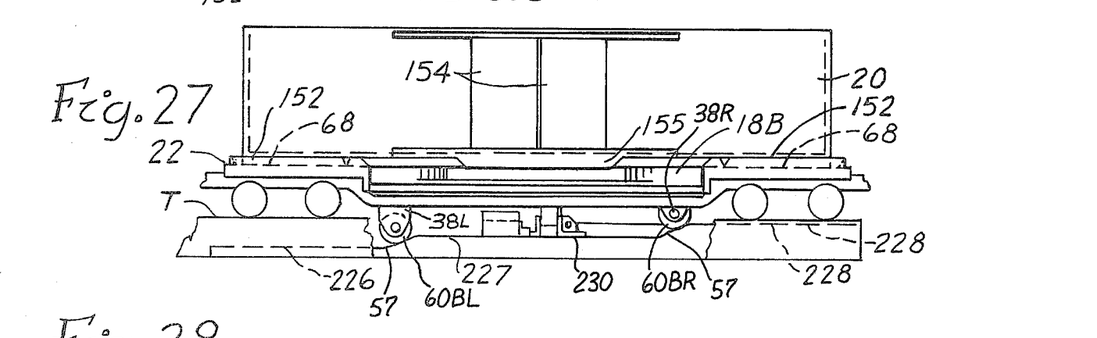
FIG. 27 is a side elevation of the container being lifted off the car by the loader of FIG. 26.
Figure 28:
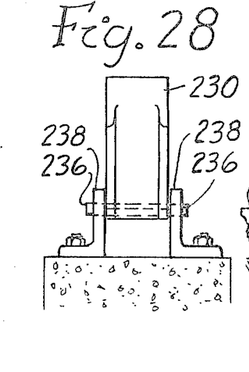
FIG. 28 is a back elevation of an automatic drawbridge switch in lifted (open) position in the cam track of FIG. 26.
Figure 29:
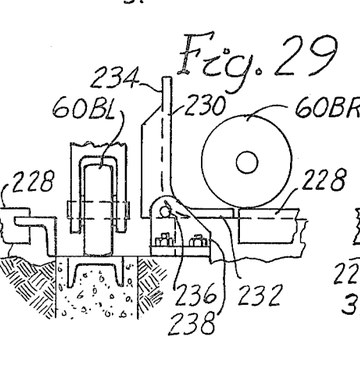
FIGS. 29 and 30 are side views of the drawbridge switch in the cam track in respectively open and closed positions with a wheel of the loader on the cam track.
Figure 30:
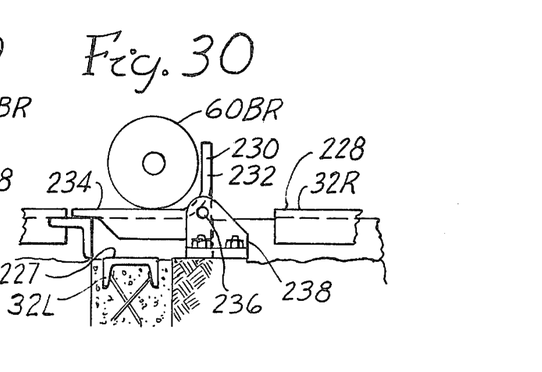

The loader is empty when it is turned clockwise to stop 178L at the left where it is shown in FIG. 26 in phantom parallel to track T and in position for coupling to unload a car 22. Starting with the loader always empty at this stop it is coupled to unload a car 22 by being driven, pulled or pushed under the container on the car to side couple it so the train pushes it counter-clockwise around and up inclines 57 lifting the container off of the car through the fully engaged position shown in FIGS. 26 and 27 and continues to turn the loader with container counterclockwise shoving them out and away from the train. The loader can be turned by any suitable means such as motor M or GM, FIGS. 23 and 24, for the right arm to rotate past dead centers to turn the B end of the container to dock D or the left-hand arm is driven counterclockwise to move through dead centers passing the dock in parallelogram form as shown in phantom and around to the left side dead-center position where arms 34BL and 34BR point to the left parallel track T wherefrom the left arm 34BL is driven or moved clockwise to bring the A end of the container to dock D as shown in phantom at the left. Loading the container back on a car 22 is the reverse process except the loader is stopped at the right-hand stop 178R to wait for an empty car 22 to couple for loading the container thereon.

Referring to FIGS. 31-34, where loader 18C has only one load support arm 34C, which rotates about pivot post 28C on cam track 32C of two concentric rails 54C and 55C. Arm 34C is a frame in the form of an issoceles triangle with a large circular turntable support on the engaging end and has a wheel 60 on the bottom of a leg 174 under each corner of the base of the triangle to support the corners on separate rails 54C and 55C which have slopes 57 spaced wheel centers distance apart to lift or lower the corners equally together. The load spreader 36C is the turntable mounted to frame 34C on pivot pin 37. It has raised pads or arms 48C for engaging the load and a yoke 50C pivotally connected at 37G to parallel guide arm 34G. Arm 34G is connected between vertical pivot 28G spaced from pivot 28C and pivot 37G on the end of yoke 50C spaced equally from pivot 37. Arm 34G is of equal length between pivots 28G and 37G as arm 34C between pivots 28C and 37 and is connected by hinge brackets 250 and 251 at its ends to the pivots to follow the up and down movement of the load spreader. Arm 34C supports the load spreader on rollers or pads 252 of low friction material around the circumference of the turntable to support and keep the turntable from tipping. The turntable disc is a full circle to keep dirt etc. off the turntable support pads.

Figure 31:
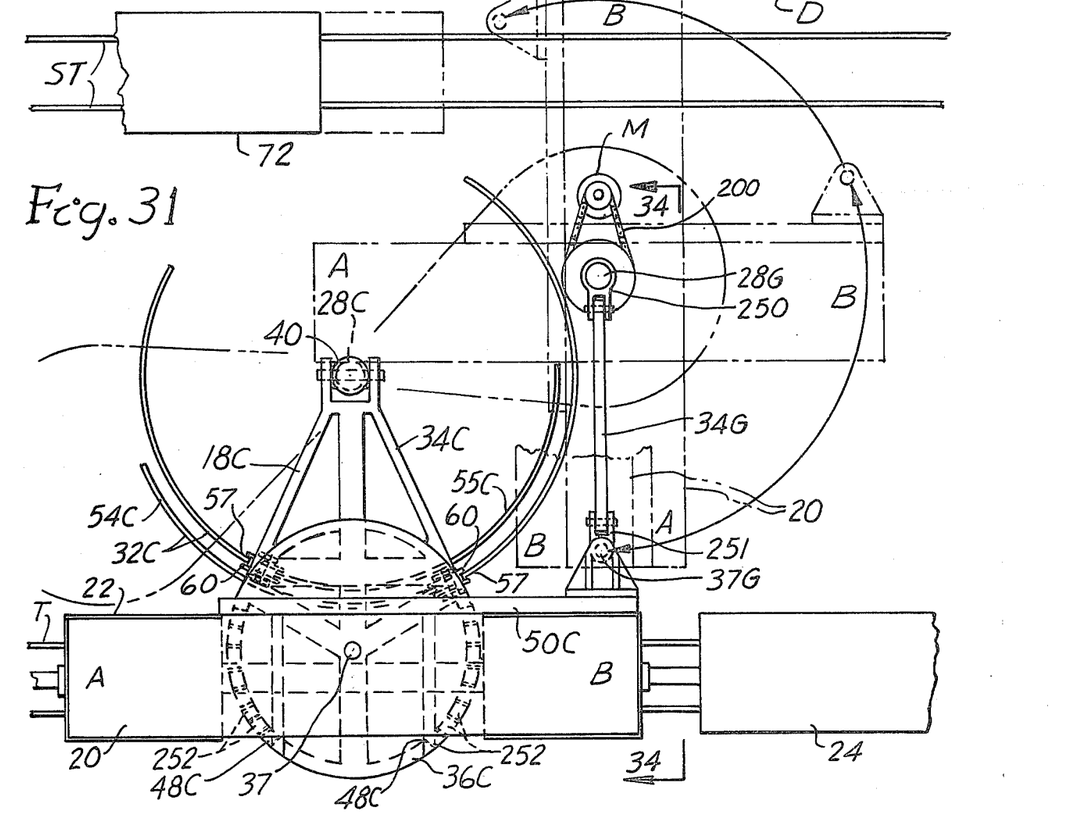
FIG. 31 is a plan view of a variation of the loader lifting a container from the car on the railroad to turn it as shown in phantom—either end to the dock.
Figures 32, 33, 34:
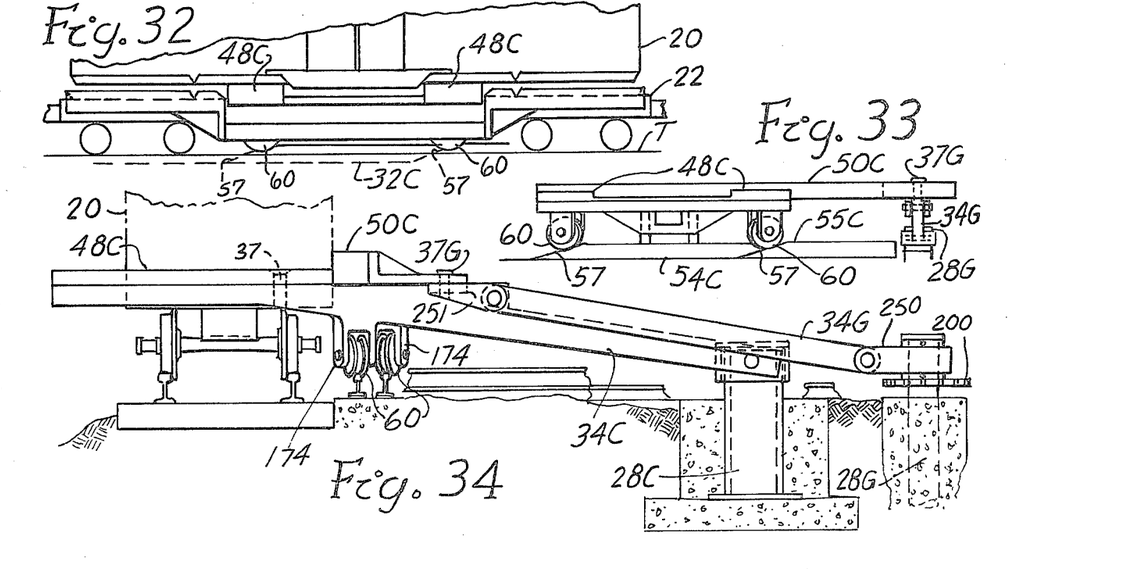
FIG. 32 is a side view of the container lifted over the car by the loader of FIG. 31.
FIG. 33 is a front elevation of the loader of FIG. 31.
FIG. 34 is a view taken on line 34—34 of FIG. 31.

This loader can be started by any suitable coupling or drive to engage car 22 from the left and lift the container when moved through the position shown in FIGS. 31-32. It lifts off the container as it continues to be turned counterclockwise and is disengaged from the car and clears the train parallel therewith. The loader is moved by any suitable means, such as motor M and chain and sprocket speed reduction drive 200 about the pivot sleeve on pivot post 28G, to dead-center position shown in phantom at the right. From this point the load spreader can be rotated in either direction by motor M driving arm 34G in that direction to bring the desired end of the load to dock D while arm 34C remains stationary.

The length of arm 34C between pivots 28C and 37 is made equal to the distance between pivots 28C and 28G so pivot 37 is directly over pivot 28G at dead-centers position with arms pointing to the right so arm 34G can be rotated in either direction to rotate the load either end to the dock while arm 34C is stationary.

Arms 34G can be made to telescope to rotate the loadspreader without need to be at dead centers, but such adjustment would require complex safety precaution and is not preferred.

Having thus described some embodiments and applications of my invention I do not wish to be limited to the disclosure herein but intend to cover by the appended claims all modifications and applications which come within the true spirit and scope of this invention.

I claim as my invention:

1. The method of using a two-parallel arm rotary loader, that has two vertical pivot posts each with a rotary arm of equal active length and a load spreader linking the arms parallelly through a transfer arc, comprising the following steps: step 1, turning the arms in the parallelogram mode to align with each other into one line; step 2, from there rotating the arm which is then pointing away from the other arm to turn the load thereon for convenient end loading or unloading; step 3, to later return the arms to the parallel in-line position of step 1 and move them together into parallelogram form for the later transfer of the load to a vehicle by the arms revolving parallelly.

2. The method of claim 1 and further comprising the modification of step 1 of turning the loader 180 degrees past the first alignment of the arms in line to the next alignment of the arms in line before commencing step 2—the turning of the load spreader to bring the opposite end of the container to position for load transfer as at a dock.

3. The method of claim 1 and further comprising in step 2 moving only the arm positioned away from the other said arm starting when both said arms are in line to rotate the load from parallel translation.

4. A rotary loader that has two vertical pivot posts each with a rotary crank arm of equal active length and a load spreader linking the arms parallelly through a transfer arc for transfer of a cargo container on the load spreader, the arms being moveable to align both arms into one line and means for turning at least one of said arms from that position relative to the other of said arms to rotate the load spreader out from parallelogram positions to turn the load spreader to turn the container to access the container.

5. A loader as in claim 11 for railway cargo containers in combination with a siding, a dock therealong, a container car for carrying at least one said container at a height substantially equal to or less than box-car floor height, said rotary loader being positioned on the opposite side of said siding opposite from said dock, said container when on said loader having been transferred from said car when on said siding, the one of said arms that is pointing away from the other of said arms being free to be turned from parallelogram form when said arms in a line to turn an end of said container on said load spreader to or slightly over said dock, said dock being of a height for a standard box car on said siding at said dock to have its floor at about the same height as said dock.

6. A loader as in claim 4, one of said means for turning being reversible power means connected to rotate the said arm which is pointing away from the other of said arms separately to turn in either direction from arms-in-line position to turn either end of a load on said loader.

7. A loader as in claim 4, said pivots being spaced apart equal to the active length of each of said arms, ie from pivot post to load spreader pivot, so the loaded out-reaching arm can be turned from dead-centers position in either direction to turn the load either end to a dock while the other of said arms is substantially stationary.

8. A rotary loader as in claim 4, a railroad track and a dock or building between which said loader is located for transfer of cargo containers to and from trains, said dock or building being spaced from said track and said arms being long enough to carry the cargo container clear of the railroad track when turned either end to the dock or building.

9. A loader as in claim 4 the arms of said loader being relatively long and two cam tracks each for supporting one of said arms, cam wheel means for supporting each of said arms on its said cam track, said cam tracks including a crossing on different levels and a drawbridge in the higher track at this crossing of the lower track and operated by the cam wheel supporting the arm on the high level so the cam wheel supporting the arm on the low level can pass when the drawbridge is open.

10. A loader as in claim 4, said container having ends and doors in only one end (as is typical) and means for turning either end of the load spreader to a dock so the end of the container having the doors can be turned to the dock.

11. A loader as in claim 4, said container being a container of box car size having ends and sides and end doors in at least one end and side doors on both sides.

12. A loader as in claim 4 and a vehicle for cooperating with said loader and having an open depressed center sill frame with end platforms for carrying one container or load holder, said platforms having low out tapered sides or curbs, said container or load holder having tapered bottom edges at the same angle as and to fit in between the tapered sides of said platform to secure the container or load holder on said vehicle.

13. A loader as in claim 12, said container having tapered blocks along the tapered bottom said edges and slots in said tapered sides into which the tapers on said blocks fit to hold the container lengthwise on the vehicle.

14. A rotary arm loader having rotary load lifting arm means, a cam track for supporting and lifting each said arm means, said cam track having two concentric circles one the high level and the other the low for each said arm means and opposite slopes and a crossing connecting said circles to form one continuous cam track for each said arm means, and grooved cam wheel means supporting said arm means and mounted for radial movement with respect to the pivot axis of rotation for each said arm means to follow its said cam track for transfer or loads to or from vehicles in either direction passing the slopes.

15. A rotary loader having at least one load support arm and a starting arm extending out therefrom and cushioned to couple, a railway car for side coupling with said loader, said starting arm having a pendant pivotally mounted to swing in a vertical plane radial to the pivot post of said load support arm, a stop catch, a stop latch on the bottom of said pendant for engaging behind said catch to hold the loader in starting position, a starting tongue lever extendible from said starting arm to be engaged by an extended said coupling on said railway car and mounted to engage and swing said pendant from behind said stop catch to release said loader to turn out toward said car for transfer.

* * * * *